United States Patent
Cui et al.

(10) Patent No.: US 10,620,009 B2
(45) Date of Patent: *Apr. 14, 2020

(54) SIMPLIFYING GPS DATA FOR MAP BUILDING AND DISTANCE CALCULATION

(71) Applicant: Uber Technologies, Inc., San Francisco, CA (US)

(72) Inventors: Sophia Cui, San Francisco, CA (US); Thi Duong Nguyen, San Francisco, CA (US); Theodore Russell Sumers, San Francisco, CA (US); Miao Yu, San Francisco, CA (US); Xingwen Zhang, Millbrae, CA (US)

(73) Assignee: Uber Technologies, Inc., San Francisco, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 15/912,224

(22) Filed: Mar. 5, 2018

(65) Prior Publication Data
US 2018/0238691 A1   Aug. 23, 2018

Related U.S. Application Data

(63) Continuation of application No. 15/009,552, filed on Jan. 28, 2016, now Pat. No. 9,939,276.

(51) Int. Cl.
*G01C 21/34*   (2006.01)
*G01C 21/32*   (2006.01)
(Continued)

(52) U.S. Cl.
CPC ............. *G01C 21/34* (2013.01); *G01C 21/32* (2013.01); *G01S 19/39* (2013.01); *G01S 19/40* (2013.01);
(Continued)

(58) Field of Classification Search
CPC .......... G01C 21/34; G01S 19/42; G01S 19/52; G07B 15/02
See application file for complete search history.

(56) References Cited

U.S. PATENT DOCUMENTS 5,917,424 A   6/1999 Goldman et al.
5,917,434 A   6/1999 Murphy
(Continued)

FOREIGN PATENT DOCUMENTS

EP   2148167 A2   1/2010
WO   WO 01/29693 A2   4/2001
WO   WO 2014/036330 A1   3/2014

OTHER PUBLICATIONS

PCT International Search Report and Written Opinion, PCT Application No. PCT/162016/058127, dated Apr. 14, 2017, 18 pages.
(Continued)

*Primary Examiner* — Hussein Elchanti
(74) *Attorney, Agent, or Firm* — Fenwick & West LLP

(57) ABSTRACT

A tracking server receives GPS data from a location tracking device located in a vehicle. The GPS data describes a path that is representative of a pathway of the vehicle used to complete a trip from a starting location to a destination location. The tracking server identifies noisy GPS data included in the received GPS data and revises a portion of path corresponding to the noisy GPS data. The tracking server may update a map database to include one or more road segments associated with the revised portion of the path. Furthermore, the tracking server may calculate a fare for the trip based on the revised path.

20 Claims, 10 Drawing Sheets

(51) Int. Cl.
- *G01S 19/39* (2010.01)
- *G01S 19/40* (2010.01)
- *G01S 19/42* (2010.01)
- *G01S 19/52* (2010.01)
- *G07C 5/00* (2006.01)
- *G07B 15/02* (2011.01)

(52) U.S. Cl.
CPC .............. *G01S 19/42* (2013.01); *G01S 19/52* (2013.01); *G07B 15/02* (2013.01); *G07C 5/008* (2013.01)

(56) References Cited

U.S. PATENT DOCUMENTS

| | | | |
|---|---|---|---|
| 9,939,276 B2 * | 4/2018 | Cui | ............. G01S 19/40 |
| 2006/0200430 A1 | 9/2006 | Kim | |
| 2010/0332124 A1 | 12/2010 | Bhatt | |
| 2012/0209518 A1 | 8/2012 | Nowak et al. | |
| 2012/0239293 A1 * | 9/2012 | Bhatt | ............. G01C 21/00 |
| | | | 701/469 |
| 2014/0067490 A1 * | 3/2014 | James | ............. G06Q 30/02 |
| | | | 705/13 |
| 2014/0129135 A1 | 5/2014 | Holden et al. | |

OTHER PUBLICATIONS

Krumm, J. et al., "Map Matching with Travel Time Constraints," SAE International, 2006, pp. 1-11.

European Patent Office, Partial Supplementary European Search Report, EP Patent Application No. 16887826.2, dated Sep. 25, 2019, 14 pages.

European Patent Office, Extended European Search Report and Opinion, EP Patent Application No. 16887826.2, dated Jan. 10, 2020, 11 pages.

* cited by examiner

SIMPLIFYING GPS DATA FOR MAP BUILDING AND DISTANCE CALCULATION

CROSS-REFERENCE TO RELATED APPLICATIONS

This application is a continuation of U.S. patent application Ser. No. 15/009,552 filed on Jan. 28, 2016 which is incorporated by reference in its entirety.

TECHNICAL FIELD

The embodiments disclosed herein generally relate to matching global positioning system (GPS) data to road segments to update maps using the GPS data and to calculate distances of trips based on the GPS data.

BACKGROUND

Current systems use GPS data from a location tracking device located in a vehicle to perform various functions such as trip distance and fare calculations. However, the GPS data typically includes noise, which results in inaccurate GPS data that is not representative of the true location of the location tracking device. Calculating distances of trips based on inaccurate GPS data may result in incorrect fare calculation.

SUMMARY

An operator of a vehicle provides services such as transporting a person or goods to a requested destination. A tracking server is in communication with a location tracking device that is located within the vehicle and receives GPS data from the location tracking device as the vehicle moves its position (e.g., travels) to complete a transport service (e.g., also referred to herein as a trip) from a starting location to the requested destination.

In some instances, some of the GPS data received from the location tracking device may include erroneous data due to an inaccurate GPS signal received by the location tracking device (e.g., as a result of noise, signal errors, etc.). Thus, the received GPS data may not accurately reflect the true position of the location tracking device, and may cause errors in processing after completion of the trip. In order to mitigate potential errors in data associated with a trip, the tracking server may revise a portion of a pathway of the trip based on the received GPS data. The portion of the pathway that is revised by the tracking server corresponds to the noisy GPS data. By revising the pathway that is representative of the trip, the tracking server ensures that the revised pathway accurately reflects the actual pathway of the transportation vehicle during the trip The revised portion of the pathway of the trip may include one or more road segments used by the vehicle to complete the trip that are not included in a map database of known road segments. The tracking server may revise the map database to include the one or more segments thereby improving the completeness of the road segments specified in the map database. Furthermore, because the revised pathway accurately reflects the true pathway of the transportation vehicle used to complete the trip, the tracking server can also calculate a more accurate fare for the trip which the person pays in exchange for the service.

The features and advantages described in this summary and the following detailed description are not all inclusive. Many additional features and advantages will be apparent to one of ordinary skill in the art in view of the drawings, specification and claims.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
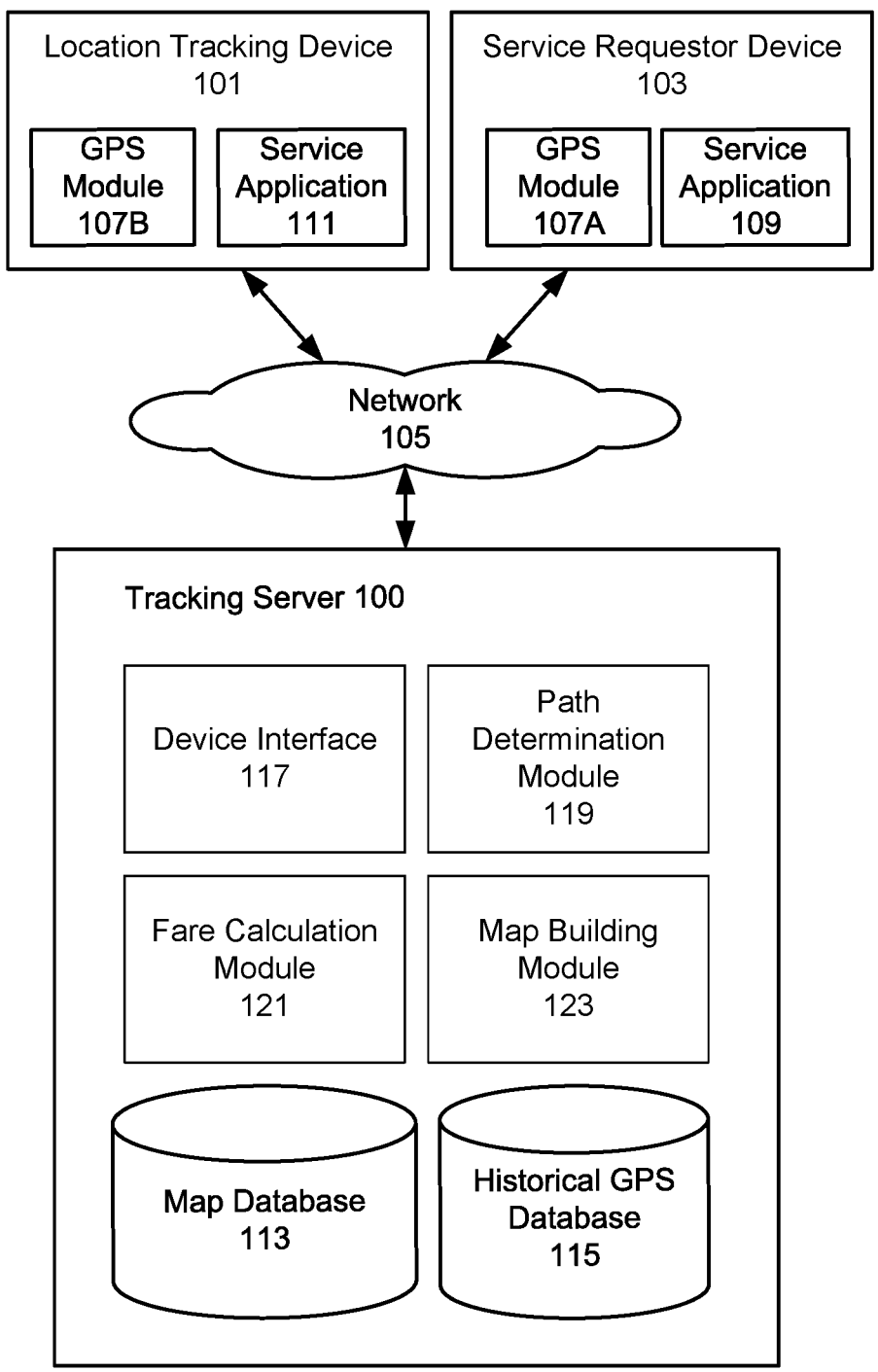
FIG. 1 illustrates a system architecture of a mapping system in accordance with one embodiment.

FIG. 1 illustrates a system architecture of a tracking server 100 in accordance with one embodiment. In particular, FIG. 1 illustrates a detailed view of modules within a tracking server 100, a location tracking device 101, and a service requestor device 103 according to one embodiment. Some embodiments of the tracking server 100, the location tracking device 101, and the service requestor device 103 have different modules than those described here. Similarly, the functions can be distributed among the modules in a different manner than is described here. As used herein, the term "module" refers to computer program logic used to provide the specified functionality. Thus, a module can be implemented in hardware, firmware, and/or software.

In one embodiment, the tracking server 100 implements a network service, such as an arrangement service, which enables services to be arranged between parties such as between the users of the location tracking device 101 and the service requestor device 103. As described herein, a location tracking device 101 can correspond to a mobile computing device, such as a smartphone, that is operated by a service provider, such as a driver of a vehicle, or can correspond to an on-board computing system of a vehicle. The tracking server 100 can also correspond to a set of servers, in some examples, and can operate with or as part of another system that implements network services. An example of the services include arranging a transport service or a delivery service between a service requestor and a service provider. In the context of the discussion herein, an operator of a transportation vehicle (e.g., the service provider) provides the service of transporting a person (e.g., the requestor) to a destination requested by the person. In one embodiment, transportation vehicles include personal vehicles such as cars and motorcycles as well as public transportation vehicles such as trains, light rail, buses, etc.

In one embodiment, the transportation of a person from a starting location to a destination location is referred to as a trip. Generally, the tracking server 100 calculates fares for trips. A fare is a monetary payment from a service requestor to a service provider in exchange for the service provider transporting the service requestor to a destination location. In one embodiment, the tracking server 100 also updates maps based on the paths of travel taken by transportation vehicles to complete trips.

The tracking server 100 receives raw GPS data from a location tracking device 101 included in a transportation vehicle as the transportation vehicle moves its position. The raw GPS data may include noise, in the form of erroneous data. Since the raw GPS data includes noise, the GPS data may not accurately reflect the true position of the location tracking device 101 at the time the GPS data was measured. The noise in the GPS data may result from a lack of an accurate GPS signal received by the location tracking device due to buildings blocking the GPS signal, for example. The tracking server 100 may compare the raw GPS data to a map matched trip. In one embodiment, a map matched trip is representative of a likely path of travel as determined by the tracking server 100 according to the raw GPS data as will be further described below. The tracking server 100 determines whether the raw GPS data matches the map matched trip based on the comparison.

In one embodiment, the tracking server 100 may revise a portion of the trip that corresponds to the noisy GPS data to accurately reflect the true pathway of the transportation vehicle during the trip. Some portions of the trip may still not match the map matched trip due to the transportation vehicle not using known road networks. The tracking server 100 determines whether to use the revised portion of the trip corresponding to the noisy GPS data or the map matched trip when calculating the fare for the trip. The tracking server 100 may also update road networks based on the GPS data of the location tracking device 101.

As shown in FIG. 1, the tracking server 100 is in communication with the location tracking device 101 and the service requestor device 103 via a network 105. In one embodiment, the network 105 is the Internet or any combination of a LAN, a MAN, a WAN, a mobile, wired or wireless network, a private network, or a virtual private network. While only a single location tracking device 101 and a single service requestor device 103 are shown in FIG. 1, any number of location tracking devices 101 can be in communication with the tracking server 100.

In one embodiment, the service requestor device 103 is an electronic device (e.g., a smart phone) of a person that requested a trip. The service requestor device 103 is used by the person to request a trip from a starting location to a destination location via a service application 109 included in the service requestor device 103. The service application 109 allows the user of the service requestor device 103 to submit a trip request, which the tracking server 100 then processes in order to select an operator of a transportation vehicle.

According to examples, the trip request may include (i) a user identifier (ID), (ii) a pickup location (e.g., a location identifier of the current position of the service requestor device 103 as determined by a GPS module 107A included in the service requestor device 103), (iii) a destination location, and/or (iv) a vehicle type. For example, the GPS module 107A uses sensors (e.g., a GPS receiver) included in the service requestor device 103 to determine the position of the service requestor device 103 at various instances in time. In one embodiment, the current position of the service requestor device 103 is represented by a location identifier such as latitude and longitude coordinates. The current position of the service requestor device 103 may also be associated with a time stamp indicating the time and/or date in which the GPS module 107A measured the current position of the service requestor device 103. Alternatively, the pickup location of the service requestor device 103 may be manually inputted into the service requestor device 103 by the user of the device 103, such as by selecting a location on a map or in the form of an address including at least a street number and street name.

The arrangement service, which is implemented by the tracking server 100 and/or other servers or systems, can receive the trip request over the network 105 and can select an operator or service provider for the requestor. In one example, the arrangement service can (i) identify a pool of service providers that are available to provide the requested service and satisfy one or more conditions (e.g., have the specified vehicle type, and/or are within a predetermined distance or estimated travel time away from the pickup location), (ii) select a service provider from the pool of service providers, and (iii) transmit an invitation to the location tracking device 101 of the service provider. The invitation can include the pickup location, so that the selected service provider can navigate to the pickup location for initiating the trip for the requestor. If the selected service provider accepts the invitation by providing input on the location tracking device 101, the tracking server 100 can notify the service requestor device 103 accordingly.

In one embodiment, the location tracking device 101 is an electronic device (e.g., a smart phone) located within the transportation vehicle used to complete trips. The location tracking device 101 includes a service application 111. The service application 111 displays, on the location tracking device 101, information about a trip that the service provider has agreed to provide, such as the pickup location, and/or navigation and/or mapping information instructing the service provider to travel to the pickup location. As referred to herein, the pickup location may be the current location of the service requestor device 103 or a location specified by the user of the service requestor device 103. The service application 111 may also display, on the location tracking device 101, the destination for the assigned trip if provided by the user of the service requestor application 111.

The location tracking device 101 includes a GPS module 107B. The GPS module 107B uses one or more sensors of the location tracking device 101 to identify GPS data of the transportation vehicle as the transportation vehicle moves along one or more roads to complete a trip. The GPS data of the transportation vehicle is representative of the transportation vehicle's position at different instances in time during a trip. For example, at time t=T1, the location tracking device 101 can be at a particular GPS location, identified by a location identifier (e.g., latitude and longitude coordinates) and a time stamp indicative of the time and/or date when the location tracking device 101 measured its current position. If the transportation vehicle is moving, at time t=T2 the location tracking device 101 can be at a different GPS location. In this manner, the location tracking device 101 periodically measures the current position of the transportation vehicle (e.g., every three seconds, every four seconds, etc.) and provides GPS data that is representative of the position of the transportation vehicle over time to the tracking server 100. Alternatively, the location tracking device 101 may provide GPS data whenever new or updated measurements of the current position of the transportation vehicle are taken or are available.

Each of the service applications 111 and 109 respectively stored at the location tracking device 101 and the service requestor device 103 can include or use an application programming interface (API) to communicate data with the tracking server 100. The API can provide access to the tracking server 100 via secure access channels over the network 105 through any number of methods, such as web based forms, programmatic access via restful APIs, Simple Object Access Protocol (SOAP), remote procedure call (RPC), scripting access, etc., while also providing secure access methods including key-based access to ensure the tracking system 100 remains secure and only authorized users, service providers, and/or third parties can gain access to the tracking server 100

As shown in FIG. 1, the tracking server 100 comprises a map database 113. The map database 113 stores a variety of map spatial databases. Map spatial databases are queryable databases identifying different points (e.g., having a latitude and longitude, and/or an altitude) along paths of trips that a given transportation vehicle can use, and information about how the different points connect with other points. Some commercially available map spatial databases include points identifying locations of interests or landmarks.

With respect to vehicles, a vehicle map database can include points corresponding to locations on roadways, highways, freeways, etc. The vehicle map database may also include other information related to roadways, such as intersections, one way streets, how the different roads and streets connect to each other, etc. Similarly, with respect to airplanes, an airplane map system spatial database can include points corresponding to locations along flight paths and what points are boundaries for no flight zones, while for trains, a train's map system spatial database can include points corresponding to locations on railroads and railways, and where/how the railroads connect. Additional map databases can be created or modified in the map database 113 as a result of real life updates and changes.

The device interface 117 manages communication between the tracking server 100, the location tracking device 101, and the service requestor device 103 over the network 105. The device interface 117 receives trip requests from the service requestor device 103 and transmits invitations to the location tracking device 101. In addition, the device interface 117 receives trip acceptances from the location tracking device 101 and routes notifications of the trip acceptances to the service requestor device 103. In one embodiment, the device interface 117 receives GPS data and/or state information about the service provider or service application 111 from the location tracking device 101 as the transportation vehicle moves to complete a trip and forwards the GPS data to a path determination module 119 included in the tracking server 100.

Figure 2:
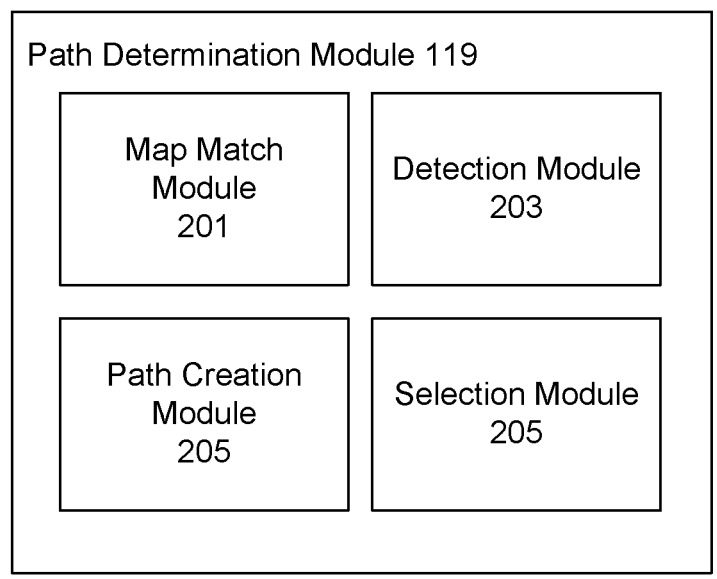
FIG. 2 illustrates a detailed view of a path determination module included in the mapping system shown in FIG. 1 according to one embodiment.

FIG. 2 illustrates a block diagram illustrating the modules of the path determination module 119 according to one embodiment. Generally, the different modules included in the path determination module 119 collectively allow the path determination module 119 to determine the path of travel along one or more roadways that a transportation vehicle is using to complete a trip. The path determination module 119 determines the path of travel of the transportation vehicle using the GPS data received from a location tracking device 101 included in the transportation vehicle.

As shown in FIG. 2, the path determination module 119 includes a map match module 201. The map match module 201 determines a pathway of one or more roadways (e.g., streets, freeways, and/or highways) that the transportation vehicle uses to complete a trip. In one embodiment, the pathway is calculated as the GPS data is received from the location tracking device 101. That is, at the GPS data is received from the location tracking device 101, the map match module 201 identifies different roadways that the transportation vehicle may use to complete the trip. In another embodiment, the map match module 201 calculates the pathway at the completion of the trip or at intermediates times during the trip, at the discretion of the implementer. In one embodiment, the path of travel of the transportation vehicle used to complete a trip is considered the map matched path of travel of the transportation vehicle. As the map match module 201 receives GPS data at difference instances in time from the location tracking device 101 included in the transportation vehicle, the map match module 201 attempts to identify which roadways the transportation vehicle is travelling on.

In one embodiment, the map match module 201 queries the map database 113 for a vehicle map database. The map match module 201 uses the vehicle map database to identify one or more candidate points of the vehicle map database that corresponds to a given GPS point included in the GPS data received from the location tracking device 101. A candidate point is a point having a latitude and longitude corresponding to a known location in the vehicle map database. For example, in the vehicle map database a candidate point can be a point that corresponds to a location on a street or at an intersection between multiple streets. As a result, the map match module 201 can identify a candidate point that best matches each GPS point included in the received GPS data.

In one embodiment, the map match module 201 identifies one or more candidate points for a given GPS point because the GPS point may not be accurate due to noise in the GPS signal received by the location tracking device 101. The map match module 201 may determine that a GPS point is potentially inaccurate based on a comparison of the GPS point and a corresponding point (e.g., latitude and longitude coordinates) in a map matched path of travel as is described below. In one embodiment, the point from the map matched path of travel that corresponds to a GPS point is a point from the map matched path of travel that is closest to the GPS point in terms of distance. Since the GPS data may be inaccurate, the GPS data received from the location tracking device 101 may not necessarily correspond to the actual position of the location tracking device 101. In one embodiment, the map match module 201 identifies one or more candidate points in the vehicle map database that are within a predetermined distance from the GPS point.

As the location tracking device 101 moves and provides updated GPS data at different instances in time to the map match module 201 or at the completion of the trip, the map match module 201 continues to identify candidate point(s) for each GPS point at each instance in time. Alternatively, the map match module 201 may identify candidate points for a subset of the GPS points included in the GPS data. The map match module 201 determines the most likely path of travel (i.e., the map matched path of travel) based on the identified candidate points in the vehicle map database.

In one embodiment, the map match module 201 selects a map matching model to determine the most likely path of travel based on the identified candidate points. For example, the map match module 201 may use a hidden Markov model solver, a routing engine, a physics engine, or other models, individually or in combination, to determine the most likely path of travel of the transportation vehicle including the location tracking device 101. In one embodiment, the determined path of travel of the transportation vehicle used to complete a trip is considered the map matched path of travel. The determined path of travel is considered to be "map matched" since the path of travel matches known road segments included in the vehicle map database.

The detection module 203 detects GPS points included in GPS data that are candidates for being potentially inaccurate due to noise in the GPS signal. If a GPS point is determined to be inaccurate, the GPS point does not accurately reflect the actual position of the location tracking device 101 at the time when the GPS point was measured. In one embodiment, the detection module 203 detects GPS points that are candidates for being inaccurate based on the map matched path of travel determined by the map match module 201.

To determine GPS points that are candidates for being inaccurate, the detection module 203 compares GPS points from the received GPS data with points of the map matched path of travel for a trip. The detection module 203 may declare a GPS point as being a candidate for being inaccurate based on the accuracy of the GPS point compared to the map matched path of travel.

In one embodiment, the accuracy of a GPS point is based on a position estimation error of the GPS point. The position estimation error of the GPS point describes the deviation in distance (e.g., meters) between the GPS point and its corresponding point in the map matched path of travel for the trip. In one embodiment, a GPS point that is within a threshold distance (e.g., 5 meters) from its corresponding point in the map matched path of travel for the trip is considered accurate by the detection module 203. Conversely, a GPS point that is located at a position greater than the threshold distance from its corresponding point in the map matched path of travel for the trip is considered a candidate for being inaccurate. As a result of the comparison between GPS points with the map matched path of travel, the detection module 203 may determine sequences of GPS points that are candidates for being inaccurate. Note that in the discussion herein, the various threshold distances are set by an implementer of the tracking server 100.

Figure 3:
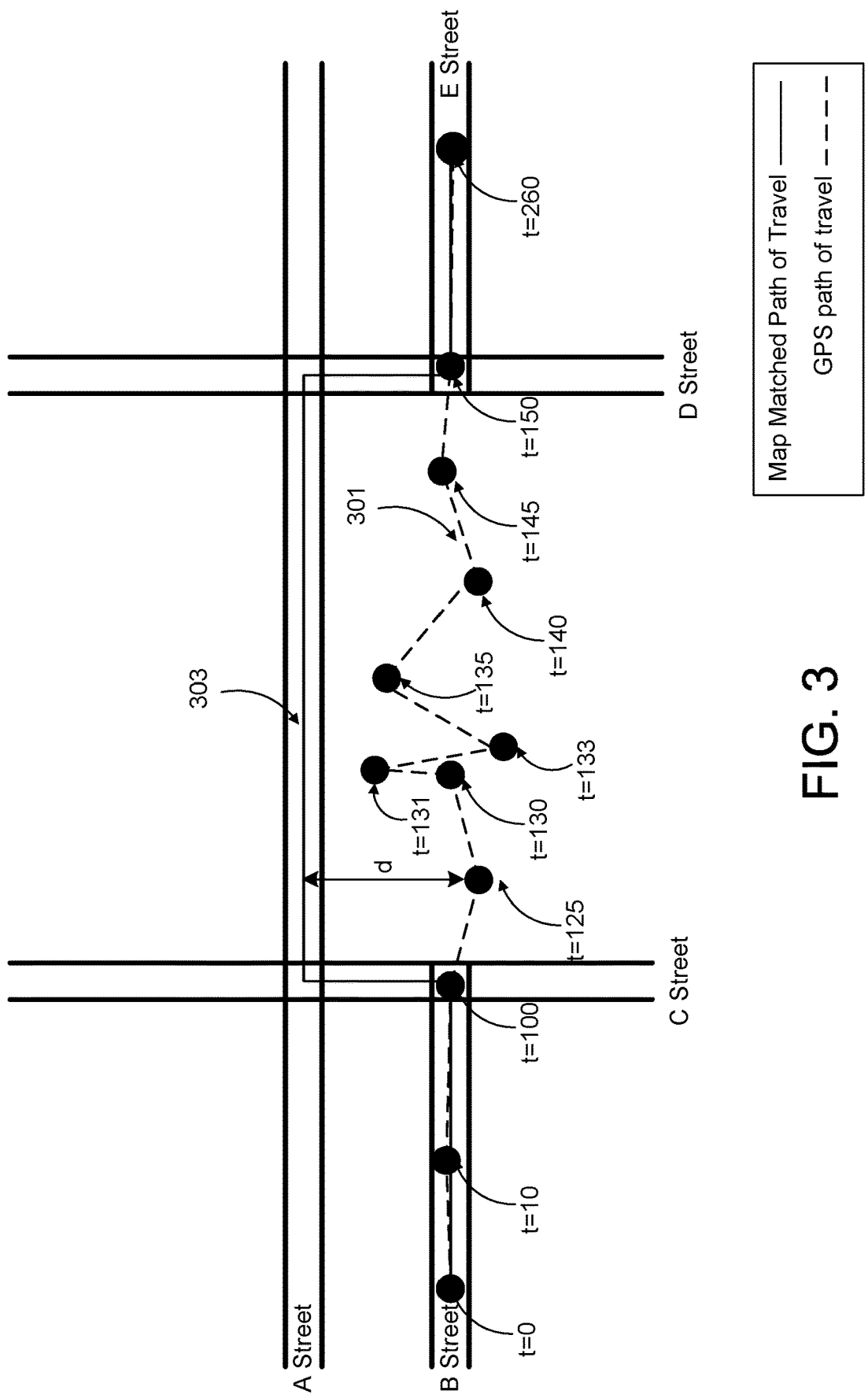
FIG. 3 illustrates GPS data associated with a trip according to one embodiment.

FIG. 3 illustrates raw GPS data of the location tracking device 101 that completed a trip according to one embodiment. FIG. 3 illustrates only a portion of all the GPS data included in a trip for ease of discussion. In FIG. 3, according to the GPS data for a trip, a transportation vehicle completed a trip starting on B street at time t=0 and ending on E street at time t=260. Each dot shown in FIG. 3 represents a GPS point included in the GPS data for a trip and the dashed line 301 that connects the GPS points in FIG. 3 represents the GPS path of travel of the transportation vehicle. The GPS path of travel represents the path of travel of the transportation vehicle according to the raw GPS data received from the location tracking device 101 included in the transportation vehicle. FIG. 3 also illustrates a map matched path of travel determined by the map match module 201 based on the received GPS data. The map matched path of travel is represented by a solid line 303 in FIG. 3.

For each GPS point shown in FIG. 3, the detection module 203 compares the GPS point with a corresponding point from the map matched path of travel to determine the accuracy for each GPS point. For example, the detection module 203 may determine that the GPS points between time t=0 and time t=100 and between time t=150 and time t=260 as accurate based on the comparison. However, the detection module 203 may determine that the GPS points of the GPS path of travel between time t=125 and time t=145 are potentially inaccurate. As mentioned above, the detection module 203 may determine that a GPS point from the GPS path of travel is potentially inaccurate based on a magnitude of the position estimation error of the GPS point with respect to the map matched path of travel. For example, the detection module 203 determines for the GPS point at time t=125 that the GPS point is potentially inaccurate because its position estimation error "d" with respect to a corresponding point in the map matched path of travel is greater than the threshold distance. The threshold distance represents a maximum deviation in location between a position of a GPS point in the GPS path of travel and a corresponding point in the map matched path of travel before the GPS point is considered to be potentially inaccurate.

Referring back to FIG. 2, the path determination module 119 also includes a path creation module 205. The path creation module 205 simplifies portions of the GPS path of travel. In one embodiment, the path creation module 205 creates a simplified path of travel for the portions of the GPS path of travel that correspond to sequences of potentially inaccurate GPS points. For example, the path creation module 205 may create a simplified path of travel for the GPS points between time t=125 and time t=145 shown in FIG. 3. By simplifying portions of the GPS path of travel that are potentially inaccurate, the path creation module 205 reduces the impact of the inaccurate points on the path of travel reported by the location tracking device 101.

To simplify a portion of the GPS path of travel, the path creation module 205 may apply an algorithm for reducing the number of points in a curve. In one embodiment, the path creation module 205 may apply the conventionally known Ramer-Douglas-Peucker (RDP) algorithm to the GPS points classified as potentially inaccurate. The path creation module 205 recursively divides the line between the GPS points classified as potentially inaccurate. Initially, the path creation module 205 is provided the points between the first and last GPS point that require simplification such as the GPS points between time t=125 and time t=145 shown in FIG. 3. The path creation module 205 automatically marks the first GPS point (e.g., at time t=125) and last GPS point (e.g., at time t=145) to be kept. The path creation module 205 then identifies the point that is furthest from a straight line segment between the first and last points. For example, the path creation module 205 identifies the GPS point at time t=131 because it is furthest from a straight line segment between the first GPS point at t=125 and the last GPS point at t=145. If the identified farthest GPS point is closer than ε (a pre-defined value set by the administrator of the tracking server 100 and stored in the tracking server 100) to the line segment between the first and last points, then any points not currently marked to be kept can be discarded without the simplified curve having an inaccuracy worse than ε. If the point farthest from the line segment is greater than ε from the line segment, then that GPS point is kept.

The path creation module 205 recursively calls the RDP algorithm with the first point and the worst (i.e. farthest) point and then with the worst point and the last point. In one embodiment, the path creation module 205 may stop the recursion when the path creation module 205 determines that a sequence of GPS points that have been deemed potentially inaccurate represent a cluster of GPS points resulting from the transportation vehicle being stationary. The path creation module 205 may determine that a sequence of GPS points results from the transportation vehicle being stationary by taking into account probable distributions of inherent GPS noise in the GPS data received from the location tracking device 101. The path creation module 205 removes points whose distribution matches those characteristics of a stationary vehicle more closely than a moving vehicle. By applying the RDP algorithm to the GPS points classified as potentially inaccurate, the path creation module 205 creates a similar curve with fewer points.

Figure 4:
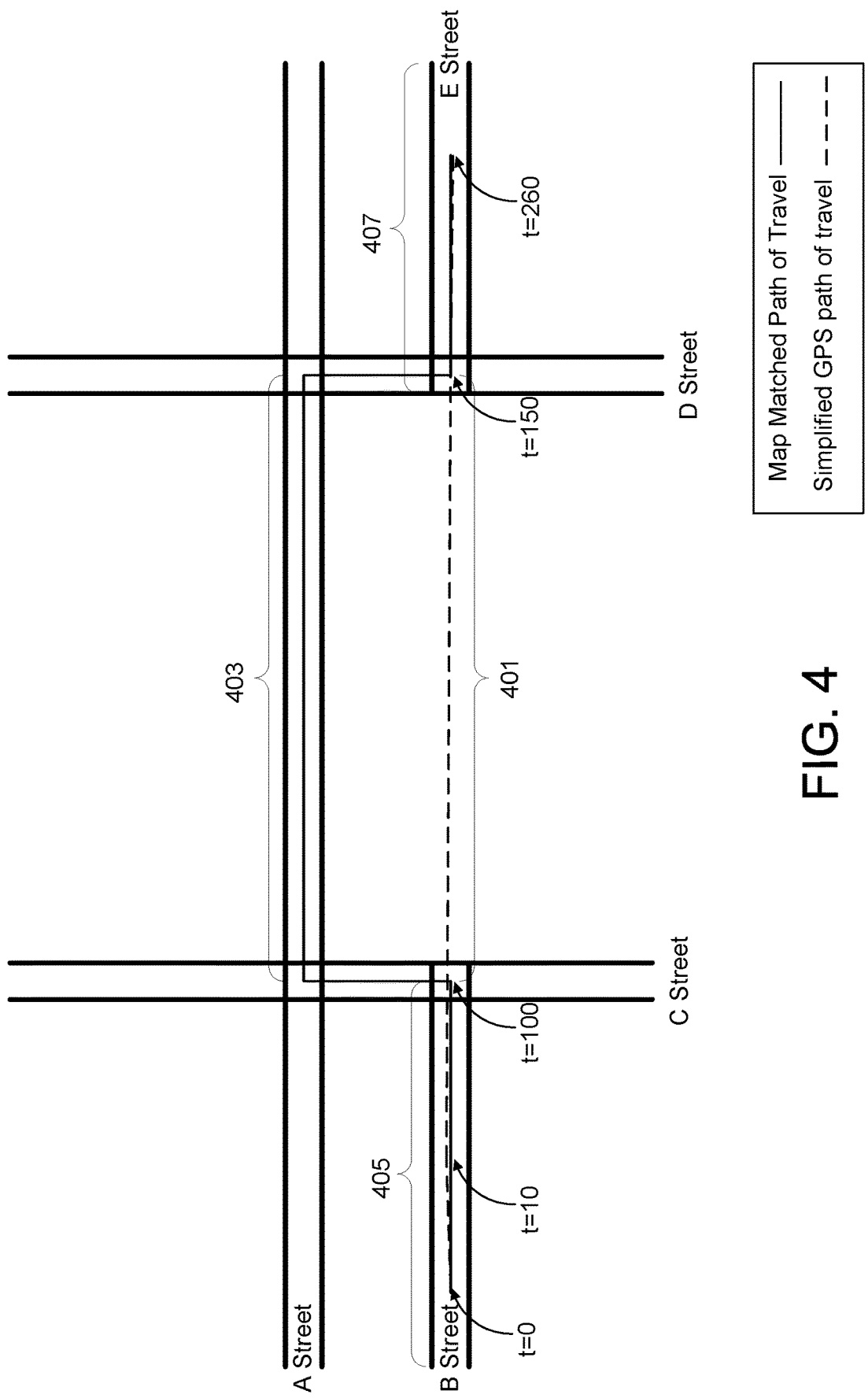
FIG. 4 illustrates a map matched path of travel and a simplified GPS path of travel according to one embodiment.

FIG. 4 illustrates a simplified GPS path of travel according to one embodiment. Similar to FIG. 3, the map matched path of travel is represented by a solid line in FIG. 4. The dashed line shown in FIG. 4 represents the simplified GPS path of travel. In particular, portion 401 of the simplified GPS path of travel represents the simplification of the GPS path of travel of the transportation vehicle between time t=125 and time t=145 in FIG. 3. As shown in FIG. 4, the path creation module 205 has simplified the GPS path of travel of the transportation vehicle between time t=125 and time t=145 to be a relatively straight line 401 shown in FIG. 4.

Referring back to FIG. 2, the path determination module 119 further includes a selection module 205. In one embodiment, the selection module 205 selects either a portion of the map matched path of travel that corresponds to the potentially inaccurate GPS points or the simplified portion of the GPS path of travel that corresponds to the potentially inaccurate GPS points for inclusion in the final path of travel of the transportation vehicle. For example, with respect to FIG. 4 the selection module 205 selects whether to include portion 401 of the simplified GPS path of travel or portion 403 of the map matched path of travel to include in the final path of travel of the transportation vehicle. The final path of travel is representative of the path of travel of the transportation vehicle to complete the trip.

The selection module 205 determines whether to select the simplified portion of the GPS path of travel based on a set of rules that govern whether to use the simplified portion of the GPS path of travel over the corresponding map matched path of travel. In one embodiment, the selection module 205 selects the simplified portion of the GPS path of travel if all of the rules described below are satisfied. Otherwise, the map matched path of travel is selected by the selection module 205.

Alternatively, the selection module 205 selects the simplified portion of the GPS path of travel if a subset of the rules described below is satisfied. The rules that are included in the subset balance between false positive selection of the simplified portion of the GPS path of travel for inclusion in the final path of travel and false negatives where the map matched path of travel is incorrectly selected rather than the simplified portion of the GPS path of travel. If the subset of rules is not satisfied, the selection module 205 selects the map matched path of travel.

To select the subset of rules, the selection module 205 applies different subsets of rules for evaluation against a set of training trips (e.g., 10,000 trips). That is the, selection module 205 applies different combinations of subsets of rules described below against the set of training trips. Each trip in the set of training trips may represent an actual trip that occurred. Applying each subset of rules against the set of training trips results in the selection of either a simplified portion of the GPS path of travel or a map matched path of travel for inclusion in a final path of travel for each trip included in the set of training trips.

The selection module 205 determines one or more subsets of rules that resulted in the most accurate selection of either a simplified portion of the GPS path of travel or a map matched path of travel for inclusion in the final path of travel. In one embodiment, the selection module 205 determine an accuracy percentage for each subset of rules under evaluation and selects a threshold number of subsets of rules (e.g., top 5 performing subsets) for further evaluation.

The selection module 205 may apply the selected subsets of rules to a set of verification trips (e.g., another 10,000 trips) to verify that the selected subset of rules is not an over fit to the set of training trips. That is, the selection module 205 further evaluates the selected subsets of rules to ensure good performance across different trips. The set of verification trips is distinct from the set of training trips.

After applying the selected subsets of rules to the set of verification trips, the selection module 205 determines the subset of rules that resulted in the most accurate selection of either a simplified portion of the GPS path of travel or a map matched path of travel for inclusion in the final path of travel for each of the trips included in the set of verification trips. The subset of rules with the best accuracy is selected for implementation in the tracking server 100. An example subset of rules that results in selection of the simplified portion of the GPS path of travel while having a very low false positive rate (e.g. below 5%) include the "neighbor" rule, the "minimum candidate" rule, the "accuracy" rule, the deviation-based rules, the similarity-based rules, the distance-based rules, the "heading" rule and the "turn" rule as described below.

In one embodiment, the set of rules includes a "neighbor" rule that is based on the neighbors of the simplified portion of the GPS path of travel. In one embodiment, the neighbor rule causes the selection module 205 to select the simplified portion of the GPS path of travel for inclusion in the final path of travel of the transportation vehicle if the segments of the GPS path of travel that are directly adjacent to the simplified portion of the GPS path of travel are accurate. Referring back to FIG. 4, portion 405 and portion 407 of the GPS path of travel are neighbors of the simplified portion 401 of the GPS path since they are directly adjacent to the simplified portion 401. To determine the neighbors, the selection module 205 identifies sequences of the sequentially ordered GPS points that were received prior to and after the GPS points that are candidate for potentially inaccurate were received. For example, the selection module 205 identifies the GPS points in portion 405 and the GPS points in portion 407 as the sequences of GPS points that were respectively received before and after the candidate GPS points were received.

The selection module 205 determines the median position estimation error of the GPS points included in the neighbor portions. If the median horizontal accuracy is less than a threshold value (e.g., 15 meters), the selection module 205 selects the simplified portion of the GPS path of travel for inclusion in the final path of travel of the transportation vehicle. The selection module 205 operates under the assumption that if the GPS data corresponding to the neighboring portions of the GPS path of travel are accurate, it is likely that the GPS data for the simplified portion of the simplified GPS path of travel is more reliable than the map-matched path of travel.

The set of rules may also include a "minimum candidate" rule requiring that the GPS points that are candidates for being inaccurate prior to simplification include a threshold amount of GPS points. For example, the rule may specify that the GPS points must include more than two GPS points that are candidates for being inaccurate. The selection module 205 may count how many GPS points are included in the candidates for being inaccurate and compare the count to a threshold. If the selection module 205 determines that the count is greater than the threshold, the selection module 205 determines that the minimum candidate rule is satisfied. Otherwise, the minimum candidate rule is not satisfied.

The set of rules may also include a "timestamp" rule requiring that the timestamps associated with the GPS points do not indicate a time gap between the measurements of the GPS points that are greater than a threshold amount of time (e.g., 10 seconds). In one embodiment, each GPS point is associated with a timestamp that indicates when the GPS point was measured by the location tracking device 101. The selection module 205 may analyze sequential pairs of GPS points to determine the amount of time that elapsed from when the GPS points were measured based on the timestamps associated with the GPS points. If the selection module 205 determines that the amount of time that elapsed from when all sequential pairs of GPS points were measured is less than the threshold amount of time, the selection module 205 determines that the timestamp rule is satisfied. If the selection module 205 determines that the amount of time that elapsed between the measurements of any one pair of GPS points is greater than the threshold, the timestamp rule is not satisfied.

The set of rules may also include a "speed" rule requiring that the transportation vehicle was travelling less than a threshold speed (e.g., 45 meters per second) at the time when the GPS points that are candidates for being inaccurate were measured by the location tracking device 101. If the transportation vehicle was travelling more than the threshold speed, the GPS data received from the location tracking device 101 is likely to be inaccurate resulting in an artificial increase in the calculated speed of the transportation vehicle.

The selection module 205 may determine the speed of travel of the location tracking device 101 by calculating the distance between the locations associated with any pairs of adjacent GPS points included in the GPS points that are candidates for being inaccurate. The selection module 205 also determines the elapsed time from when the pairs of GPS points were measured based on the timestamps associated with the pairs of GPS points. The selection module 205 determines the speed of the transportation vehicle by calculating the quotient of the distance between the locations associated with the pairs of GPS points and the elapsed time from when the pairs of GPS points were measured. If the speed of the transportation vehicle is less than the threshold speed for all of the pairs of GPS points, the selection module 205 determines that the speed rule is satisfied. However, if the speed of the transportation vehicle is greater than the threshold speed for any pair of GPS points, the selection module 205 determines that the speed rule is not satisfied.

The set of rules may also include an "accuracy" rule that requires the GPS points that are candidates for being inaccurate have a median position estimation error that is less than an accuracy threshold. In one embodiment, the accuracy threshold is 15 meters. To determine the median position estimation error, the selection module 205 determines the position estimation error for each GPS point compared to its corresponding point in the map matched path of travel as previously described above. The selection module 205 calculates the median position estimation error based on the position estimation errors calculated for the GPS points. If the median position estimation error is less than the accuracy threshold, the selection module 205 determines that the accuracy rule is satisfied. However, if the median position estimation error is greater than the accuracy threshold, the selection module 205 determines that the accuracy rule is not satisfied.

In another embodiment of the accuracy rule, the selection module 205 compares the median position estimation error of the GPS points that are candidates for being inaccurate to a weighted median position estimation error of the entire trip. In one example, the median position estimation error of the entire trip is weighted by a factor of two. If the selection module 205 determines that the median position estimation error of the GPS points that are candidates for being inaccurate is less than the weighted median position estimation error for the entire trip, the accuracy rule is satisfied. Otherwise, the selection module 205 determines the accuracy rule is not satisfied.

The set of rules may also include one or more "deviation" rules. In one embodiment, the deviation rules include a rule that requires that the deviation of the map-matched path of travel to be greater than a weighted deviation of the simplified portion of the GPS path of travel. The weight may be set by an administrator of the tracking server 100 to any value such as 1.25.

Each potentially inaccurate raw GPS candidate is associated with a corresponding point in the map matched path of travel and a corresponding point in the simplified portion of the GPS path of travel. The selection module 205 calculates the deviation of the map-matched path of travel by first measuring the distance between each potentially inaccurate candidate and its corresponding point in the map matched path of travel. The selection module 205 then identifies the average distance and associates the deviation of the map-matched path of travel with the identified value.

Similarly, the selection module 205 calculates the deviation of the simplified portion of the GPS path of travel by first measuring the distance between each candidate for being inaccurate with its corresponding point in the simplified portion of the GPS path of travel. The selection module 205 then identifies the average distance and associates the deviation of the simplified GPS path of travel with the identified value. The selection module 205 multiples the deviation of the simplified portion of the GPS path of travel with the weighting factor. Lastly, the selection module 205 determines whether the deviation of the map-matched path of travel is greater than the weighted deviation of the simplified portion of the GPS path of travel to determine whether the rule is satisfied.

The deviation rules may also include an average deviation rule that requires the average deviation of the simplified portion of the GPS path of travel to be less than or equal to a threshold distance such as 10 meters. To determine whether the average deviation rule is satisfied, the selection module 205 measures the distance between each candidate for being inaccurate with its corresponding point in the simplified portion of the GPS path of travel as mentioned above. The selection module 205 then calculates the average of the measured distances and compares the average with the threshold distance. If the average is less than or equal to the threshold distance, the selection module 205 determines that the average deviation rule is satisfied.

The deviation rules may also include a percentile rule that requires a threshold percentile (e.g., 95%) of the deviations of the simplified portion of the GPS path of travel is less than or equal to a threshold distance such as 30 meters. To determine whether the percentile rule is satisfied, the selection module 205 measures the distance between each candidate for being inaccurate with its corresponding point in the simplified portion of the GPS path of travel as mentioned above. The selection module 204 then determines whether the threshold percentile (e.g., 95%) of the measured distances is less than or equal to the threshold distance. If the threshold percentile (e.g., 95%) of the measured distances is less than or equal to the threshold distance, the selection module 205 determines that the percentile rule is satisfied.

The set of rules may also include one or more "similarity" rules. In one embodiment, the similarity rules include an average similarity rule that requires the average similarity between the simplified GPS path of travel and its associated portion in the map matched path of travel to be greater than a threshold distance (e.g., 15 meters).

As mentioned previously, each of the points in the simplified GPS path of travel and the map matched path of travel are associated with time stamps. The selection module 205 determines the similarity between the simplified GPS path of travel and its associated portion in the map matched path of travel by determining time stamps from the simplified GPS path of travel that are a relative match with time stamps from the map matched path of travel. Time stamps are considered to match if they are within one second, for example. For each pair of matching time stamps, the selection module 205 determines the distance between the simplified GPS path of travel and the map matched path of travel. The selection module 205 then calculates the average of the distances. If the average of the distances is greater than the threshold distance (e.g., 15 meters), the selection module 205 determines that the average similarity rule is met. Otherwise, the average similarity rule is not satisfied.

In one embodiment, the similarity rules include a "maximum" similarity rule. The maximum similarity rule requires that the maximum (i.e., largest) distance between the simplified GPS path of travel and the map matched path of travel with matching time stamps is greater than a threshold (e.g., 25 meters). To determine whether the maximum similarity rule is satisfied, the selection module 205 determines the largest distance between the simplified GPS path of travel and the map matched path of travel with matching time stamps. The selection module 205 compares the largest distance to the threshold (e.g., 25 meters). If the largest distance is greater than the threshold, the selection module 205 determines that maximum similarity rule is satisfied.

The set of rules may also include a "distance traveled" rule. The traveled distance rule specifies that the difference in distance travelled between the simplified GPS path of travel and the corresponding portion of the map matched travel is greater than a threshold percentage (e.g., 25%). To determine whether the distance traveled rule is satisfied, the selection module 205 calculates the distance traveled in both the simplified GPS path of travel and the corresponding portion of the map matched path of travel. If the selection module 205 determines that the distance traveled in the simplified GPS path of traveled is greater than the threshold percentage of the map matched path of travel, the distance traveled rule is satisfied.

The set of rules may also include a "heading" rule. The heading rule specifies that the difference in direction of travel between the simplified GPS path of travel and the corresponding portion of the map matched path of travel is greater than a threshold angle (e.g., 10 degrees). To determine whether the heading rule is satisfied, the selection module 205 calculates the direction of travel for the simplified GPS path of travel. To calculate the direction of travel for the simplified GPS path of travel, the selection module 205 determines the angle formed between the horizon and a line connecting the first point and the center of all points in the simplified GPS path of travel. Similarly, to calculate the direction of travel for the corresponding portion of the map matched path of travel, the selection module 205 determines the angle formed between the horizon and a line connecting the first point and the center of all points in the map matched path of travel. In one embodiment, the difference in angles must be greater than a threshold angle (e.g., 10 degrees) for the selection module 205 to determine that the direction change rule is satisfied.

Lastly, the set of rules may also include a "turn" rule. The turn rule disfavors a simplified GPS path of travel that involves frequent turns. To determine whether the turn rule is satisfied, the selection module 205 determines for each turn in the simplified GPS path of travel the distance between the turn and the next subsequent turn if any. The selection module 205 calculates an average distance travelled between turns and compares the average distance to a threshold (e.g., 15 meters). In one embodiment, the selection module 205 determines that the turn rule is satisfied if the average distance travelled between turns is greater than the threshold (e.g., 15 meters).

As described above, the selection module 205 determines whether to include the simplified GPS path of travel in the final path of travel of the transpiration vehicle based on whether a subset of the rules described above are satisfied. In one embodiment, all of the rules described herein must be satisfied in order for the selection module 205 to include the simplified GPS path of travel in the final path of travel of the transportation vehicle. Alternatively, any combination of the rules described above must be satisfied as determined by an administrator of the tracking server 100 for the selection module 205 to include the simplified GPS path of travel in the final path of travel of the transportation vehicle.

Figure 5:
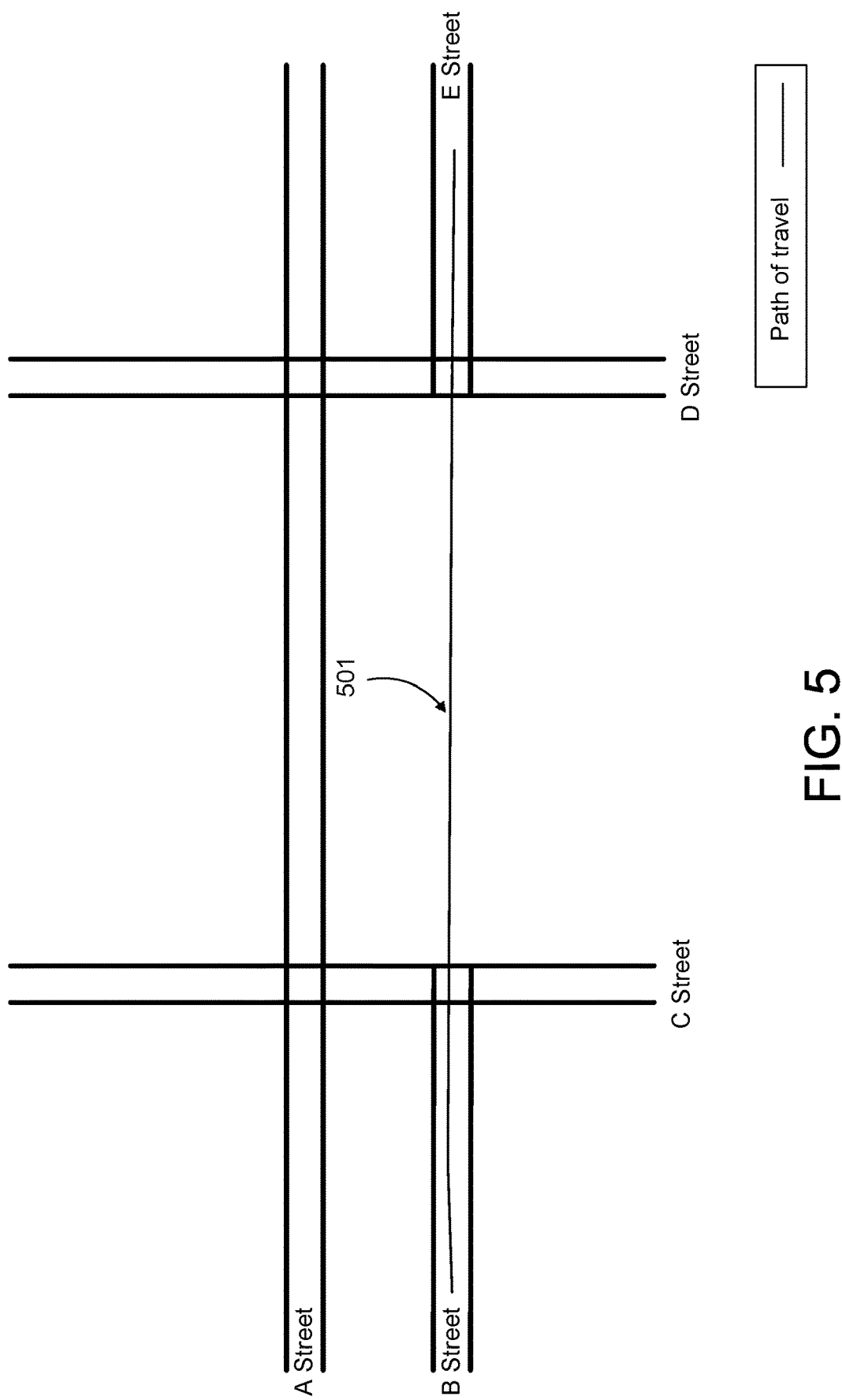
FIG. 5 illustrates a final path of travel according to one embodiment.

The selection module 205 includes the selected portion of either the map matched path of travel or the simplified GPS path of travel in the final path of travel of the transportation vehicle. In one embodiment, the selection module 205 connects the simplified portion of the GPS path of travel to the neighboring map matched path of travel to establish the final path of travel of the transportation vehicle. If the selection module 205 selects the portion of the map matched path of travel for inclusion in the final path of travel of the transportation vehicle, the selection module 205 uses the map matched path of travel as the final path of travel of the transportation vehicle. For example, FIG. 5 shows the final path of travel of a trip completed by the transportation vehicle. The final path of travel of the trip includes the simplified portion 401 of the GPS path of travel shown in FIG. 4.

Returning back to FIG. 1, the tracking server 100 also includes a fare calculation module 121. The fare calculation module 121 calculates fares for completed trips. In one embodiment, the fare calculation module 121 calculates a fare for a completed trip based on the finalized path of travel for a trip that includes simplified portions of the GPS path of travel described above. By basing the fare on the finalized path of travel rather than on the GPS path of travel, the tracking server 100 calculates the most accurate fare possible.

To calculate the fare, the fare calculation module 121 calculates the distance from the starting location of a trip to the destination location of the trip along the finalized path of travel. For example, the fare calculation module 121 determines the distance in miles or meters from the starting location of the trip to the destination location of the trip. The fare calculation module 121 then determines the cost per distance travelled (e.g., cost per mile such as $1.30 per mile) for the trip. The cost per distanced travelled is associated with the geographic location associated with the trip. For example, the cost per distanced travelled for the San Francisco Bay Area, Calif. may be different than the cost per distance travelled for Los Angeles, Calif. The fare calculation module 121 multiplies the cost per distance travelled with the distance travelled to determine the distance component of the fare.

In one embodiment, the fare for a trip is also based the amount of time required to complete the trip. The fare calculation module 121 may determine the amount of time it took to complete the trip based on the time stamps associated with the GPS points received from the location tracking device 101 and multiples the time by a cost per time travelled (e.g., cost per minute) to calculate the time component of the fare. The cost per time travelled may also be dependent on the geographic location associated with the trip.

In one embodiment, the fare for a trip is also associated with a base fare. The base fare is a bare minimum that the person that requested the trip will be charged for the trip. The fare calculation module 121 may add the distance component, the time component, and the base fare to determine the fare for the trip. The fare calculation module 121 then applies a payment method of the person that requested the trip (e.g., charges a credit card) and communicates the fare to the service application 109 of the service requestor device 103 of the person. Through the techniques described herein, the improvement to fare calculation is a technical improvement that enables a more accurate distance calculation that is not available through conventional GPS measurement technology.

Referring back to FIG. 1, a historical GPS database 115 stores final paths of travel of trips completed by transportation vehicles. Thus, the historical GPS database 115 stores a history of trips (e.g., the paths of travel) completed by different transportation vehicles. In one embodiment, the historical GPS database 115 stores GPS coordinates of the transportation vehicles used to complete the trips specified in the GPS database 115. The GPS coordinates may be stored in a list or table form.

Figure 6:
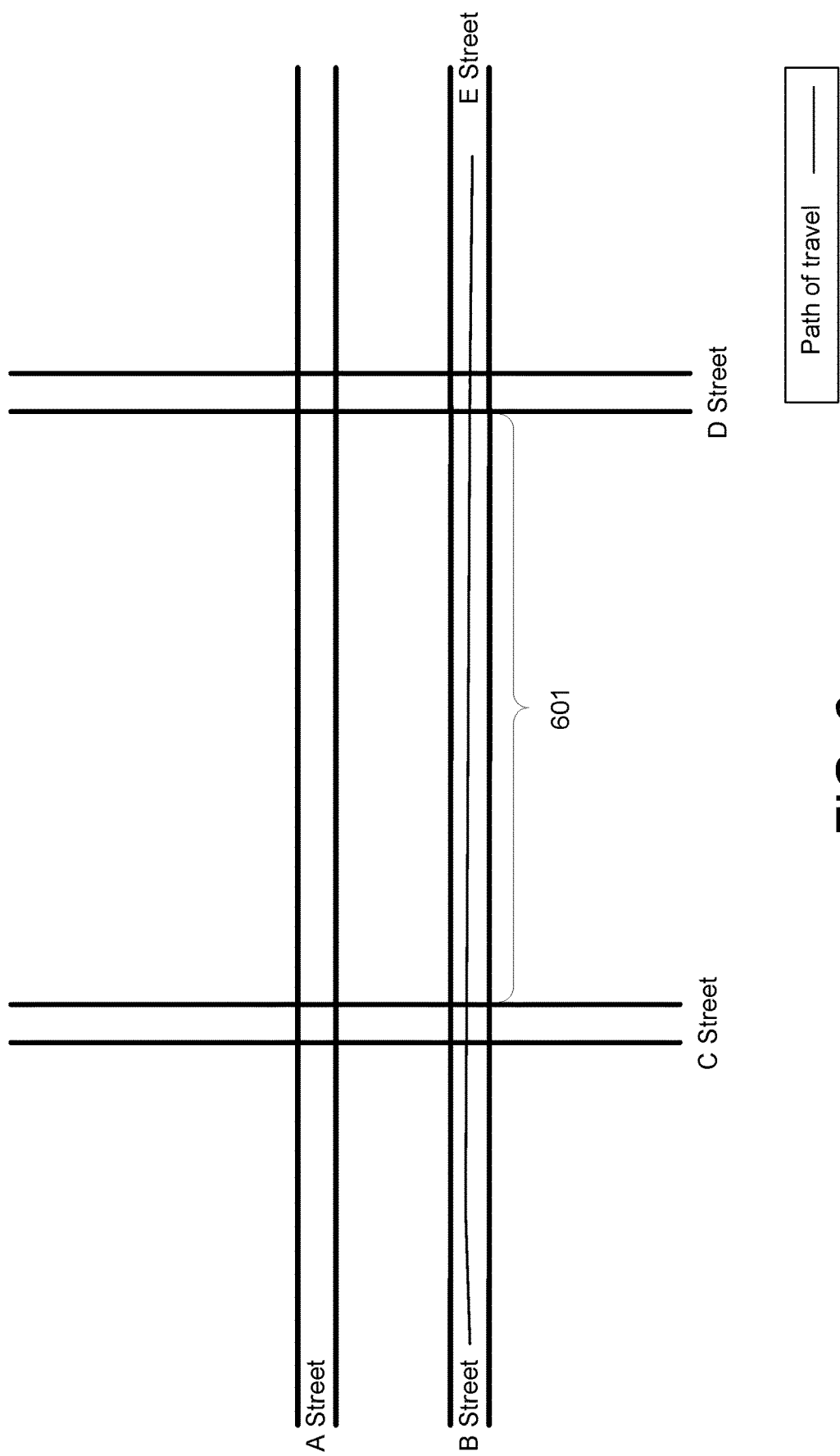
FIG. 6 illustrates an updated map based on the simplified GPS path of travel according to one embodiment.

A map building module 123 updates the map database 113 based on the history of trips stored in the historical GPS database 115. The map building module 123 uses the history of trips to update roadway information stored in the map database 113. For example, the history of trips included in the historical GPS database 115 may include trips that were completed via road segments that are non-existent according to the map database 113. The map building module 123 may update the map database 113 to include road segments used to complete the trips stored in the historical GPS database 115. For example, FIG. 5 illustrates the map of the area in which a trip was completed. As shown in FIG. 5, the trip was completed via a road segment 501 that is non-existent in the map database 113. FIG. 6 illustrates an updated map of the area where the trip was completed. As shown in FIG. 6, the map building module 123 has added a road segment 601 to the map.

In one embodiment, the map building module 123 adds a road segment to the map database 113 if the road segment is used in at least a threshold number of trips, for example 50 trips. If the map building module 123 determines that the road segment is used in at least the threshold number of trips, the map building module 123 adds the road segment to the map database 113 since enough trips have been completed via the road segment to accurately determine that a road actually exists. If the map building module 123 determines that the road segment is not used in the threshold amount of trips, the map building module 123 refrains from adding the road segment to the map database 113. Thus, the map building module 123 ensures that the road segment is actually existent before updating the map database 113.

Figure 7A:
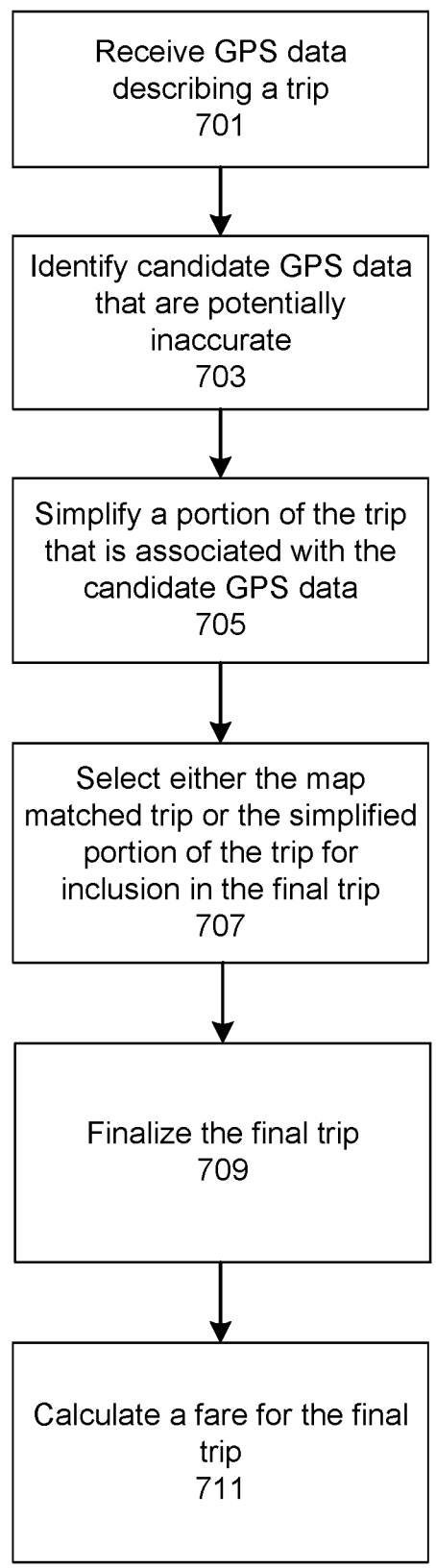
FIG. 7A is a method flow for calculating a fare for a trip, according to one embodiment.

FIG. 7A illustrates one embodiment of a method flow diagram for determining a trip of a transportation vehicle. Note that in other embodiments, steps other than those shown in FIG. 7 may be performed to determine the trip for the transportation vehicle.

In one embodiment, the tracking server 100 receives 701 GPS data describing a trip of a transportation vehicle. The GPS data is received from a location tracking device 101 located within the transportation vehicle. According to some examples, the GPS data can be received during the progress of the trip and associated with the trip (e.g., until the trip is completed). Subsequently, in one example, the tracking server 100 can perform one or more steps of FIG. 7A after the trip has completed. As an addition or an alternative, the tracking server 100 can perform one or more steps of FIG. 7A, such as steps 703 to 707, while the trip is in progress.

The tracking server 100 identifies 703 candidate GPS data from the received GPS data that are potentially inaccurate. The candidate may be inaccurate due to noise in the GPS signal. The tracking server 100 determines that a GPS data is a candidate for being inaccurate by comparing GPS points included in the GPS data with points included in a map matched path of travel for the trip.

The tracking server 100 simplifies 705 a portion of the trip that is associated with the candidate GPS data that are inaccurate. By simplifying the portion of the trip that is potentially inaccurate, the tracking server 100 minimizes the inaccuracy of the path of travel taken by a transportation vehicle to complete the trip as reported by the location tracking device 101. The tracking server 100 selects 707 either the map matched trip of the simplified portion of the trip for inclusion in the final representation of the trip. The tracking server 100 may make the selection based on the rules previously described above.

The tracking server 100 finalizes 709 the final trip data based on the selection. Finalizing the trip data comprises the tracking server 100 including the selected portion of the trip in the final pathway of travel for the trip. The tracking server 100 can then perform one or more operations, e.g., post-trip processing, using the trip data, such as (i) generating a map with an image of the final pathway overlaid on the map for an in-application receipt or email receipt for the requestor and/or the service provider, (ii) calculating 711 a fare for the trip based on the final pathway of travel, (iii) causing the respective payment or finance mechanisms of the requestor and/or the service provider to be charged and/or credited, and/or (iv) transmitting data for the receipt to the respective devices.

Figure 7B:
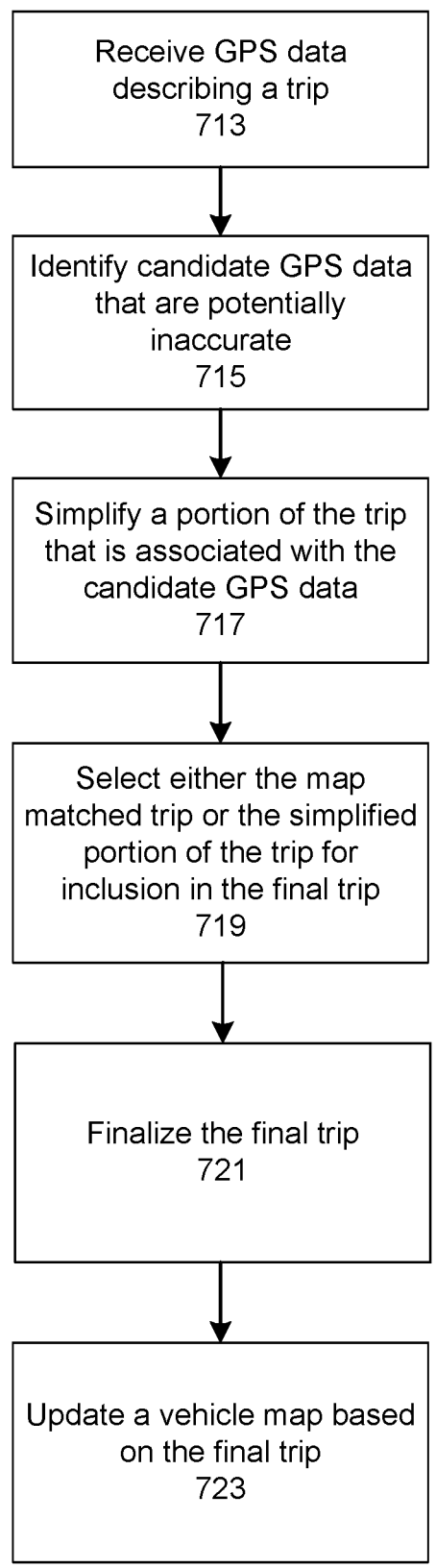
FIG. 7B is a method flow for updating a map, according to one embodiment.

FIG. 7B illustrates one embodiment of a method flow diagram for updating a vehicle map based on a trip of a transportation vehicle according to one embodiment. Note that in other embodiments, steps other than those shown in FIG. 7B may be performed.

In one embodiment, the tracking server 100 receives 713 GPS data describing a trip of a transportation vehicle. The tracking server 100 identifies 715 candidate GPS data from the received GPS data that are potentially inaccurate. The tracking server 100 simplifies 717 a portion of the trip that is associated with the candidate GPS data that are inaccurate. By simplifying the portion of the trip that is potentially inaccurate, the tracking server 100 minimizes the inaccuracy of the path of travel taken by a transportation vehicle to complete the trip as reported by the location tracking device 101. The tracking server 100 selects 719 either the map matched trip or the simplified portion of the trip for inclusion in the final representation of the trip. The tracking server 100 may make the selection based on the rules previously described above.

The tracking server 100 finalizes 721 the final trip based on the selection. Finalizing the trip comprises the tracking server 100 including the selected portion of the trip in the final pathway of travel for the trip. The tracking server 100 updates 723 a vehicle map based on the final trip such as by including roadways used in the final trip that are non-existent in the vehicle map.

Hardware Components

Figure 8:
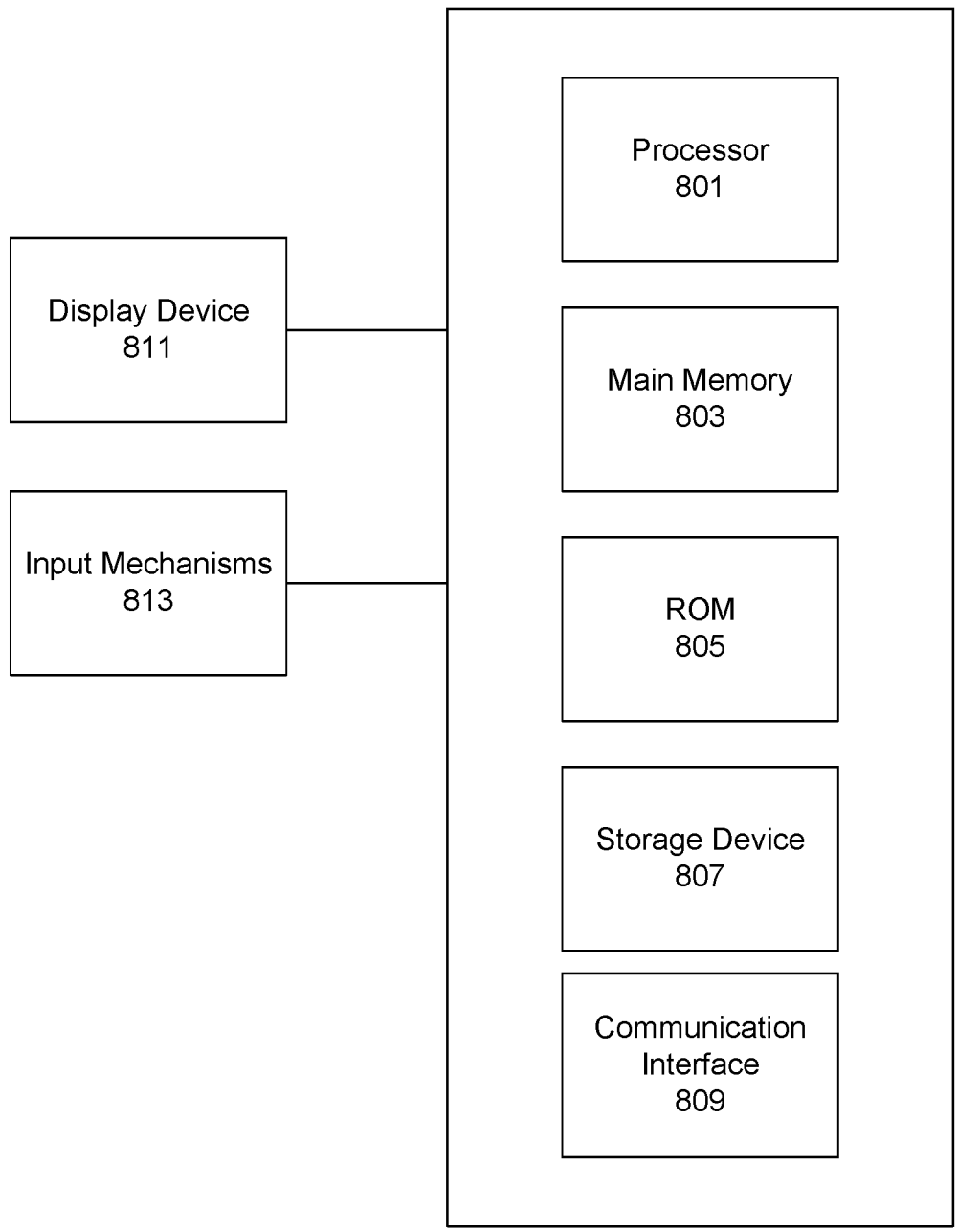
FIG. 8 illustrates a computer system that implements the embodiments herein according to one embodiment.

FIG. 8 is a diagram illustrating a computer system upon which embodiments described herein may be implemented. For example, in the context of FIG. 1, the tracking server 100 may be implemented using a computer system such as described by FIG. 8. The tracking server 100 may also be implemented using a combination of multiple computer systems as described by FIG. 8.

In one implementation, the tracking server 100 includes processing resources 801, main memory 803, read only memory (ROM) 805, storage device 807, and a communication interface 809. The tracking server 100 includes at least one processor 801 for processing information and a main memory 803, such as a random access memory (RAM) or other dynamic storage device, for storing information and instructions to be executed by the processor 801. Main memory 803 also may be used for storing temporary variables or other intermediate information during execution of instructions to be executed by processor 801. Tracking server 100 may also include ROM 805 or other static storage device for storing static information and instructions for processor 801. The storage device 807, such as a magnetic disk or optical disk, is provided for storing information and instructions.

The communication interface 809 can enable the tracking server 100 to communicate with one or more networks (e.g., cellular network) through use of the network link (wireless or wireline). Using the network link, the tracking server 100 can communicate with one or more computing devices, and one or more servers. In some variations, the tracking server 100 can be configured to receive sensor data (e.g., such as GPS data) from one or more location tracking devices via the network link. The sensor data can be processed by the processor 801 and can be stored in, for example, the storage device 807. The processor 801 can process the sensor data of a location tracking device in order to determine the path of travel of a transportation vehicle corresponding to the location tracking device. Extrapolated position information can be transmitted to one or more service requestor devices over the network 105 to enable the service applications 109 running on the service requestor devices to use the position information to present a visualization of the actual movement of the transportation vehicles.

The tracking server 100 can also include a display device 811, such as a cathode ray tube (CRT), an LCD monitor, or a television set, for example, for displaying graphics and information to a user. An input mechanism 813, such as a keyboard that includes alphanumeric keys and other keys, can be coupled to the tracking server 100 for communicating information and command selections to processor 801. Other non-limiting, illustrative examples of input mechanisms 813 include a mouse, a trackball, touch-sensitive screen, or cursor direction keys for communicating direction information and command selections to processor 801 and for controlling cursor movement on display device 811.

Examples described herein are related to the use of the tracking server 100 for implementing the techniques described herein. According to one embodiment, those techniques are performed by the tracking server 100 in response to processor 801 executing one or more sequences of one or more instructions contained in main memory 803. Such instructions may be read into main memory 803 from another machine-readable medium, such as storage device 807. Execution of the sequences of instructions contained in main memory 803 causes processor 801 to perform the process steps described herein. In alternative implementations, hard-wired circuitry may be used in place of or in combination with software instructions to implement examples described herein. Thus, the examples described are not limited to any specific combination of hardware circuitry and software.

Figure 9:
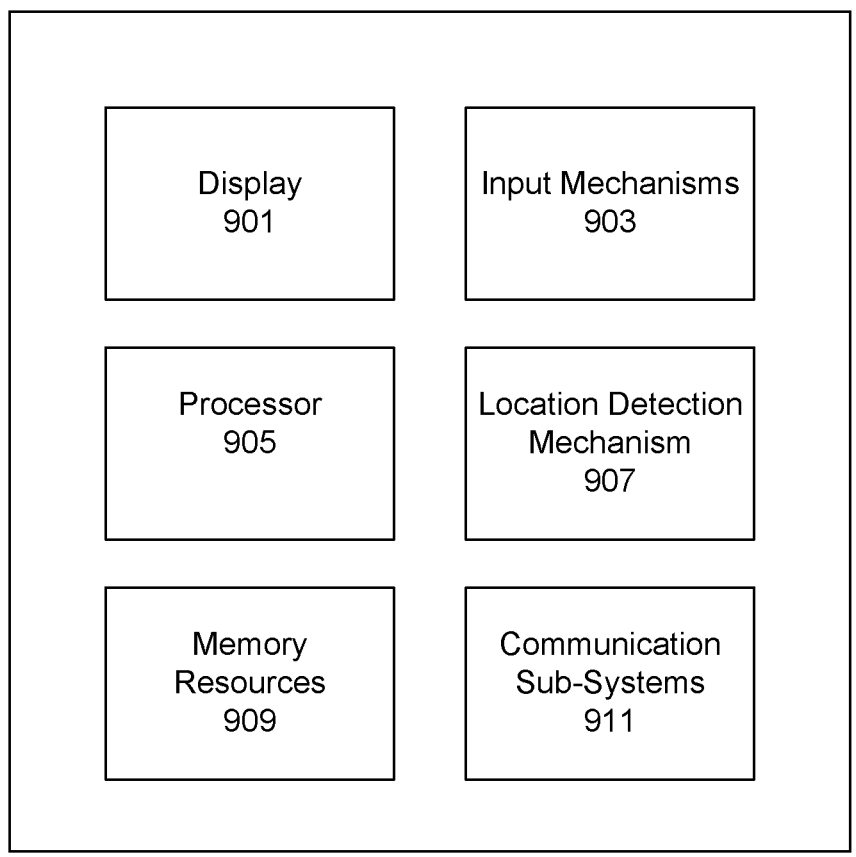
FIG. 9 illustrates a mobile computing device that implements the embodiments herein according to one embodiment.

FIG. 9 is a diagram illustrating a mobile computing device upon which embodiments described herein may be implemented. In one embodiment, a computing device 900 may correspond to a mobile computing device, such as a cellular device that is capable of telephony, messaging, and data services. The computing device 900 can correspond to each of the location tracking device 101 and the service requestor device 103. Examples of such devices include smartphones, handsets or tablet devices for cellular carriers. Computing device 900 includes a processor 905, memory resources 909, a display device 901 (e.g., such as a touch-sensitive display device), one or more communication sub-systems 911 (including wireless communication sub-systems), input mechanisms 903 (e.g., an input mechanism can include or be part of the touch-sensitive display device), and one or more location detection mechanisms (e.g., GPS module) 907. In one example, at least one of the communication sub-systems 911 sends and receives cellular data over data channels and voice channels.

The processor 905 is configured with software and/or other logic to perform one or more processes, steps and other functions described with implementations, such as those described herein. Processor 905 is configured, with instructions and data stored in the memory resources 909, to operate a service application as described herein. For example, instructions for operating the service application in order to display user interfaces can be stored in the memory resources 909 of the computing device 900.

From the viewpoint of a service provider, a service provider operating a location tracking device 101 can operate the service application 111 so that sensor data, such as location/position data, can be determined from the location detection mechanism 907. This location/position data can then be wirelessly transmitted to the system via the communication sub-systems 911. From the viewpoint of an end-user, a user can operate the service application 109 in order to receive position information of one or more transportation vehicles from the system (via the communication sub-systems 911).

The processor 905 can provide content to the display 901 by executing instructions and/or applications that are stored in the memory resources 909. In some examples, one or more user interfaces can be provided by the processor 905, such as a user interface for the service application, based at least in part on the received position information of the one or more transportation vehicles. While FIG. 9 is illustrated for a mobile computing device, one or more embodiments may be implemented on other types of devices, including full-functional computers, such as laptops and desktops (e.g., PC).

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

We claim:

1. A computer-implemented method for updating digital maps, the method comprising:
receiving global positioning satellite (GPS) data for a vehicle describing a trip by the vehicle from a starting location to a destination location along a path;
predicting a path of travel of the vehicle from the starting location to the destination location based on known road segments in a map database and the GPS data of the vehicle;
identifying a plurality of candidate GPS points from the GPS data that are potentially inaccurate, the candidate GPS points located along a portion of the path and the plurality of candidate GPS points corresponding to geographical positions that are not associated with known road segments in the map database;
generating a simplified portion of the path that corresponds to the candidate GPS points that are potentially inaccurate;
determining whether to include in the path the simplified portion of the path or a portion of the predicted path of travel that corresponds to the plurality of candidate GPS points;
selecting either the simplified portion of the path or the portion of the predicted path of travel to include in the path based on the determination;
revising the path based on the selection;
updating the map database to include one or more road segments corresponding to the geographical positions of the plurality of candidate GPS points based on the path being revised to include the simplified portion;
generating a map based on the updated map database, the map including an image of the path of the trip overlaid onto the map, wherein the image of the path includes the simplified portion of the path; and
transmitting the map to a device of a service requestor that was in the vehicle during the trip.

2. The computer-implemented method of claim 1, wherein identifying the plurality of candidate GPS points comprises:
comparing GPS points from the GPS data to the predicted path of travel;
determining an accuracy of each GPS point based on the comparison of each GPS point to the predicted path of travel; and
determining the plurality of candidate GPS points based on the accuracy of each of the plurality of GPS points.

3. The computer-implemented method of claim 1, wherein generating the simplified portion comprises:

applying a Ramer-Douglas-Peucker algorithm to the plurality of candidate GPS points to generate the simplified portion.

4. The computer-implemented method of claim 1, wherein determining whether to include in the path the simplified portion of the path or the portion of the predicted path of travel is based on a set of rules.

5. The computer-implemented method of claim 4, wherein the set of rules includes a neighbor rule specifying to select the simplified portion of the path for inclusion in the path based on an accuracy of GPS points that neighbor the plurality of GPS points associated with the simplified portion, the method further comprising:
 identifying, from the GPS data of the vehicle, a first plurality of sequentially ordered GPS points that were received prior to the plurality of candidate GPS points associated with the simplified portion being received;
 identifying, from the GPS data of the vehicle, a second plurality of sequentially ordered GPS points that were received after the plurality of candidate GPS points associated with the simplified portion were received;
 identifying a first accuracy associated with the first plurality of sequentially ordered GPS points and a second accuracy associated with the second plurality of sequentially ordered GPS points; and
 selecting the simplified portion of the path for inclusion in the revised path based on the first accuracy and the second accuracy.

6. The computer-implemented method of claim 4, wherein the set of rules includes a rule requiring that the plurality of candidate GPS points include a threshold amount of GPS points, the method further comprising:
 counting a number of GPS points included in the plurality of candidate GPS points;
 comparing the count to a threshold; and
 selecting the simplified portion of the path for inclusion in the revised path based on the count exceeding the threshold.

7. The computer-implemented method of claim 4, wherein the set of rules includes a rule requiring that elapsed times between measurement of each of the plurality of candidate GPS points is less than a threshold, the method further comprising:
 determining an amount of time that elapsed from when the location tracking device measured each sequential pair of candidate GPS points included in the plurality of candidate GPS points;
 comparing the amount of time to the threshold; and
 selecting the simplified portion of the path for inclusion in the revised path based on each amount of time being less than the threshold.

8. The computer-implemented method of claim 4, wherein the set of rules includes a rule requiring that the speed of the transportation vehicle when the plurality of candidate GPS points were measured be less than a speed threshold, the method further comprising:
 calculating a speed of the transportation vehicle between each sequential pair of candidate GPS points when the plurality of candidate GPS points were measured;
 comparing the calculated speed to the speed threshold; and
 selecting the simplified portion of the path for inclusion in the revised path responsive to the calculated speed being less than the speed threshold.

9. The computer-implemented method of claim 4, wherein the set of rules includes a rule requiring that the accuracy of the plurality of candidate GPS points be less than an accuracy threshold, the method further comprising:
 calculating a median accuracy of the plurality of candidate GPS point with respect to the predicted path of travel of the vehicle; and
 selecting the simplified portion of the path for inclusion in the revised path responsive to the median accuracy being less than the accuracy threshold.

10. A computer program product comprising a non-transitory computer readable storage medium storing executable code for calculating a fare for a trip, the code when executed by one or more computer processors causes the one or more computer processors to perform steps comprising:
 receiving global positioning satellite (GPS) data for a vehicle describing a trip by the vehicle from a starting location to a destination location along a path;
 predicting a path of travel of the vehicle from the starting location to the destination location based on known road segments in a map database and the GPS data of the vehicle;
 identifying a plurality of candidate GPS points from the GPS data that are potentially inaccurate, the candidate GPS points located along a portion of the path and the plurality of candidate GPS points corresponding to geographical positions that are not associated with known road segments in the map database;
 generating a simplified portion of the path that corresponds to the candidate GPS points that are potentially inaccurate;
 determining whether to include in the path the simplified portion of the path or a portion of the predicted path of travel that corresponds to the plurality of candidate GPS points;
 selecting either the simplified portion of the path or the portion of the predicted path of travel to include in the path based on the determination;
 revising the path based on the selection;
 updating the map database to include one or more road segments corresponding to the geographical positions of the plurality of candidate GPS points based on the path being revised to include the simplified portion;
 generating a map based on the updated map database, the map including an image of the path of the trip overlaid onto the map, wherein the image of the path includes the simplified portion of the path; and
 transmitting the map to a device of a service requestor that was in the vehicle during the trip.

11. The computer program product of claim 10, wherein identifying the plurality of candidate GPS points comprises:
 comparing GPS points from the GPS data to the predicted path of travel;
 determining an accuracy of each GPS point based on the comparison of each GPS point to the predicted path of travel; and
 determining the plurality of candidate GPS points based on the accuracy of each of the plurality of GPS points.

12. A computer-implemented method for updating digital maps, the method comprising:
 receiving first global positioning satellite (GPS) data for a first vehicle describing a first trip along a first path by the first vehicle from a first starting location to a first destination location, the first path defined by the first GPS data;
 identifying a plurality of candidate GPS points from the first GPS data that are potentially inaccurate, the candidate GPS points located along a portion of the first path and the plurality of candidate GPS points corresponding to geographical positions that are not associated with known road segments in a map database;

simplifying the portion of the first path that corresponds to the plurality of candidate GPS points;

establishing the first path that includes the simplified portion as a first candidate for a true pathway of the first vehicle from the starting location to the destination location during the first trip;

predicting a second path of the first vehicle from the starting location to the destination location based on a combination of known road segments in the map database and the GPS data of the first vehicle;

establishing the second path as a second candidate for the true pathway of the first vehicle from the starting location to the destination location during the first trip;

selecting either the first candidate or the second candidate as the true pathway of the first vehicle;

updating the map database to include one or more road segments corresponding to the simplified portion of the first path based on the first candidate being selected as the true pathway of the first vehicle;

receiving second global positioning satellite (GPS) data for a second vehicle describing a second trip along a second path by the second vehicle from a second starting location to a second destination location, the second path defined by the second GPS data; and predicting a path of the second vehicle from the second starting location to the second destination location based on the known road segments in the updated map database and the second GPS data of the second vehicle, the predicted path of the second vehicle comprising at least one of the one or more road segments corresponding to the simplified portion of the first path that was included in the updated map database.

13. The computer-implemented method of claim 12, wherein identifying the plurality of candidate GPS points comprises:

comparing GPS points from the GPS data to the second path;

determining an accuracy of each GPS point based on the comparison of each GPS point to the second path; and determining the plurality of candidate GPS points based on the accuracy of each of the plurality of GPS points.

14. The computer-implemented method of claim 12, wherein simplifying the portion of the first path comprises:

applying a Ramer-Douglas-Peucker algorithm to the plurality of candidate GPS points to generate the simplified portion of the first path.

15. The computer-implemented method of claim 12, wherein selecting either the first candidate or the second candidate as the true pathway of the vehicle is based on a set of rules.

16. The computer-implemented method of claim 15, wherein the set of rules includes a neighbor rule specifying to select the first candidate as the true pathway based on an accuracy of GPS points that neighbor the plurality of GPS points associated with the simplified portion of the first path, the method further comprising:

identifying, from the GPS data of the vehicle, a first plurality of sequentially ordered GPS points that were received prior to the plurality of candidate GPS points associated with the simplified portion of the first path being received;

identifying, from the GPS data of the vehicle, a second plurality of sequentially ordered GPS points that were received after the plurality of candidate GPS points associated with the simplified portion of the first path were received;

identifying a first accuracy associated with the first plurality of sequentially ordered GPS points and a second accuracy associated with the second plurality of sequentially ordered GPS points; and selecting the first candidate as the true pathway for the vehicle based on the first accuracy and the second accuracy.

17. The computer-implemented method of claim 15, wherein the set of rules includes a rule requiring that the plurality of candidate GPS points include a threshold amount of GPS points, the method further comprising:

counting a number of GPS points included in the plurality of candidate GPS points;

comparing the count to a threshold; and selecting the first candidate as the true pathway based on the count exceeding the threshold.

18. The computer-implemented method of claim 15, wherein the set of rules includes a rule requiring that elapsed times between measurement of each of the plurality of candidate GPS points is less than a threshold, the method further comprising:

determining an amount of time that elapsed from when the location tracking device measured each sequential pair of candidate GPS points included in the plurality of candidate GPS points;

comparing the amount of time to the threshold; and selecting the first candidate as the true pathway based on each amount of time being less than the threshold.

19. The computer-implemented method of claim 15, wherein the set of rules includes a rule requiring that the speed of the transportation vehicle when the plurality of candidate GPS points were measured be less than a speed threshold, the method further comprising:

calculating a speed of the transportation vehicle between each sequential pair of candidate GPS points when the plurality of candidate GPS points were measured;

comparing the calculated speed to the speed threshold; and selecting the first candidate as the true pathway responsive to the calculated speed being less than the speed threshold.

20. The computer-implemented method of claim 15, wherein the set of rules includes a rule requiring that the accuracy of the plurality of candidate GPS points be less than an accuracy threshold, the method further comprising:

calculating a median accuracy of the plurality of candidate GPS point with respect to the second path; and selecting the first candidate as the true pathway responsive to the median accuracy being less than the accuracy threshold.

* * * * *